(12) United States Patent
Wotherspoon

(10) Patent No.: US 8,393,629 B2
(45) Date of Patent: Mar. 12, 2013

(54) TOW HITCH ACCESSORY

(75) Inventor: Stephen Wotherspoon, Wynnum (AU)

(73) Assignee: Couplemate Trailer Parts Pty Ltd, Wynnum, Queensland (AU)

( * ) Notice: Subject to any disclaimer, the term of this patent is extended or adjusted under 35 U.S.C. 154(b) by 0 days.

(21) Appl. No.: 13/112,917

(22) Filed: May 20, 2011

(65) Prior Publication Data

US 2011/0285104 A1 Nov. 24, 2011

(30) Foreign Application Priority Data

May 20, 2010 (AU) ................................ 2010902208

(51) Int. Cl.
*B60D 1/60* (2006.01)
(52) U.S. Cl. ...................................... 280/163; D12/203
(58) Field of Classification Search .................. 280/163, 280/164.1, 166, 169, 175, 186, 507; D12/203; 293/117, 120
See application file for complete search history.

(56) References Cited

U.S. PATENT DOCUMENTS

| | | | | |
|---|---|---|---|---|
| 5,358,269 A * | 10/1994 | Jakeman et al. | ........... | 280/490.1 |
| 5,738,362 A * | 4/1998 | Ludwick | ........................ | 280/166 |
| 7,081,197 B1 * | 7/2006 | Davis | ............................. | 280/507 |
| 7,090,104 B2 * | 8/2006 | Dorety | ............................ | 224/524 |
| 7,204,507 B1 * | 4/2007 | James | ............................ | 280/507 |
| 2002/0125677 A1 * | 9/2002 | Knodle et al. | ................ | 280/166 |
| 2004/0160034 A1 * | 8/2004 | Mitchell | ........................ | 280/163 |
| 2007/0205580 A1 * | 9/2007 | Hamilton et al. | .............. | 280/477 |
| 2008/0168929 A1 * | 7/2008 | Thompson | ........................ | 108/44 |

\* cited by examiner

*Primary Examiner* — John Walters
*Assistant Examiner* — James Triggs
(74) *Attorney, Agent, or Firm* — Schwabe, Williamson & Wyatt

(57) ABSTRACT

The invention relates to a device for attachment to a tow hitch comprising a step including a platform and at least one step connecting portion, a base including at least one base connecting portion and a mounting portion, the mounting portion which may be removably secured to the tow hitch, wherein the step connecting portion is removably attached to the base connecting portion.

14 Claims, 6 Drawing Sheets

TOW HITCH ACCESSORY

CROSS REFERENCE TO RELATED APPLICATIONS

The present application claims priority to AU Application No. 2010902208, titled "Tow Hitch Accessory," filed May 20, 2010, the specification of which is hereby incorporated by reference in its entirety.

TECHNICAL FIELD

The invention relates to an accessory for a tow hitch. In particular, although not exclusively, the invention relates to a step for attachment to a tow hitch.

BACKGROUND

The use of tow hitches for towing trailers, caravans and the like behind a vehicle is commonplace. The towing vehicle is often also fitted with roof racks or roof storage, which people wish to access whilst in situ. Often in these situations people are tempted to stand on the tow ball or tow hitch to access items which are out of reach of a person standing on the ground. However, this is an unsafe practice, particularly as the tow ball is often rounded and it is easy for the person to slip.

Steps are sometimes fitted to the rear of the towing vehicle on either side of the tow hitch. However, the tow ball protrudes above the level of the steps and is still accessible for a person to stand on. Additionally, the tow ball is a trip hazard if a person moves sideways along these steps.

Some tow hitch steps have been used having a base which is fitted into the tow hitch in place of a tow ball. However, as these tow hitch steps require removal of the tow ball, there is then potential for the tow ball to be mislaid. Additionally, the extra effort required to remove the tow ball prior to installing the step may deter a person from using the step and instead they will choose to stand on the tow ball.

BRIEF DESCRIPTION OF THE DRAWINGS

To assist in understanding the invention and to enable a person skilled in the art to put the invention into practical effect preferred embodiments of the invention will be described by way of example only with reference to the accompanying drawings, wherein.

DETAILED DESCRIPTION

In one form, although it need not be the only or indeed the broadest form, the invention resides in a device for attachment to a tow hitch comprising: a step including a platform and at least one step connecting portion; a base including at least one base connecting portion and a mounting portion which is removably secured to the tow hitch; wherein the step connecting portion is removably attached to the base connecting portion.

In one embodiment the step connecting portion is at least one step spigot and the base connecting portion is at least one base socket for receiving the at least one step spigot.

In another embodiment the base connecting portion is at least one base spigot and the step connecting portion is at least one step socket for receiving the at least one base spigot.

Preferably, the step further comprises a resilient buffer located to prevent the platform from contacting a tow ball mounted on the tow hitch when the device is in use.

Further features of the present invention will become apparent from the following detailed description.

Figure 1:
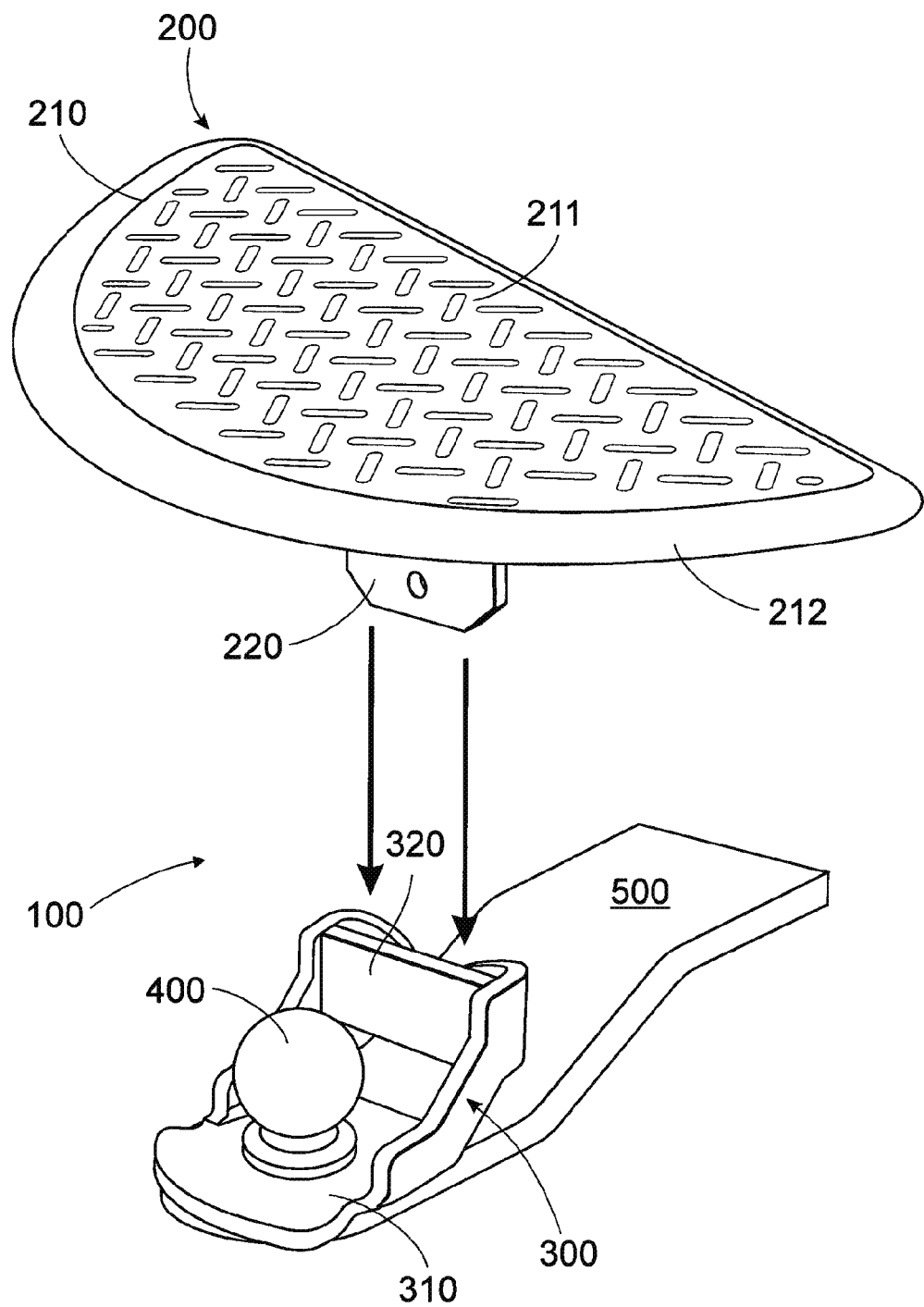
FIG. 1 shows a device according to an embodiment of the invention in an exploded perspective view.

A device 100 to be attached to a tow hitch 500, as shown in exploded view in FIG. 1, includes a step 200 removably attached to a base 300, such that the step 200 is located above a tow ball 400.

The step 200 includes a platform 210 and a step connecting portion 220. The platform 210 is a semi-circular shape, although other shapes such as square, rectangular or ovoid, may be contemplated. Suitably, a top surface 211 of the platform 210 is formed with a number of projections and/or depressions in order to give a non-slip surface. Alternatively, the top surface 211 is coated with a non-slip coating. In one embodiment, a portion of the top surface 211 may allow for imprinting or attaching a logo or trade mark.

An edge 212 of the platform 210 is also rounded, which may reduce the possibility of injury arising from contact with the edge 212.

Figure 2:
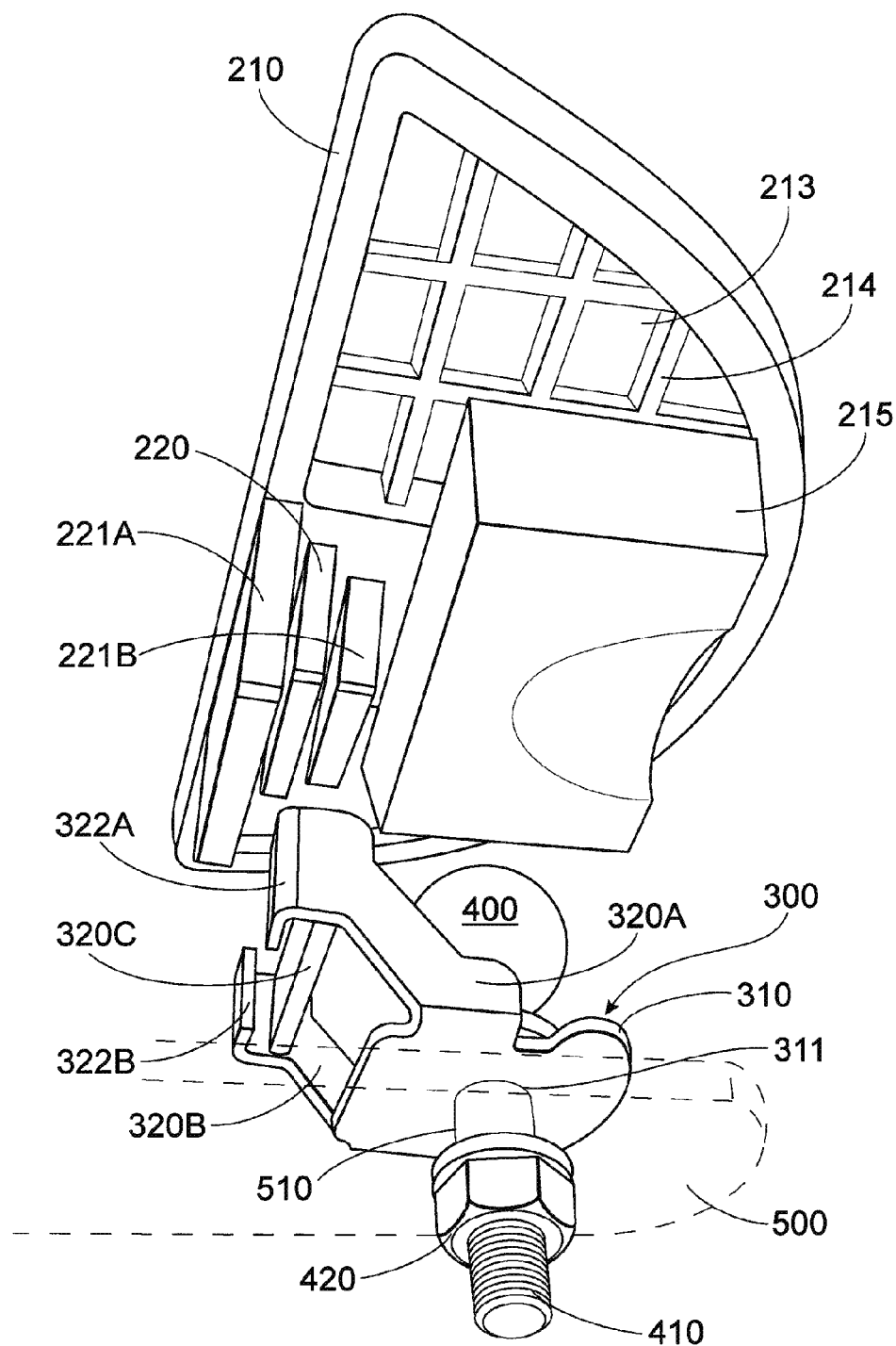
FIG. 2 shows a view from below of the device of FIG. 1.

A bottom surface 213 of the platform 210, as shown in FIG. 2, includes strengthening ribs 214 to provide the platform 210 with mechanical strength.

A resilient buffer 215 is located on the bottom surface 213 of the platform 210. The resilient buffer 215 is suitably shaped to complement the shape of the tow ball 400. Alternatively, the resilient buffer 215 extends to surround a portion of the tow ball 400. The resilient buffer 215 is suitably formed from rubber or a polymer and prevents contact between the platform 210 and the tow ball 400 when the step 200 is in use.

The step connecting portion 220 is a tongue connected to and extending from the platform 210. Stabilizing tongues 221A, 221B may also extend from the platform 210 to prevent lateral movement and accidental dislodgement of the step 200 when it is in use.

The base 300 includes a mounting portion 310 and a base connecting portion 320. The mounting portion 310 is in the form of a plate, shaped similarly to an end portion of a tow hitch 500. The mounting portion 310 includes a base aperture 311 for securing the base 300 to the tow hitch 500.

Struts 320A, 320B extend from the mounting portion 310 and are joined by a crosspiece 320C. Strut extensions 322A, 322B, which are ends of the struts 320A, 320B distal from the mounting portion 310, are bent to provide the base connecting portion 320 as a slot bounded by the crosspiece 320C and the strut extensions 322A, 322B. Alternatively, the strut extensions 322A, 322B may be joined to form a second crosspiece. In a further alternative, the crosspiece 320C includes an aperture.

Also shown is tow ball screw 410 extending from tow ball 400. Tow ball screw 410 passes through tow hitch aperture 510. Nut 420 screws onto tow ball screw 410.

Figure 3:
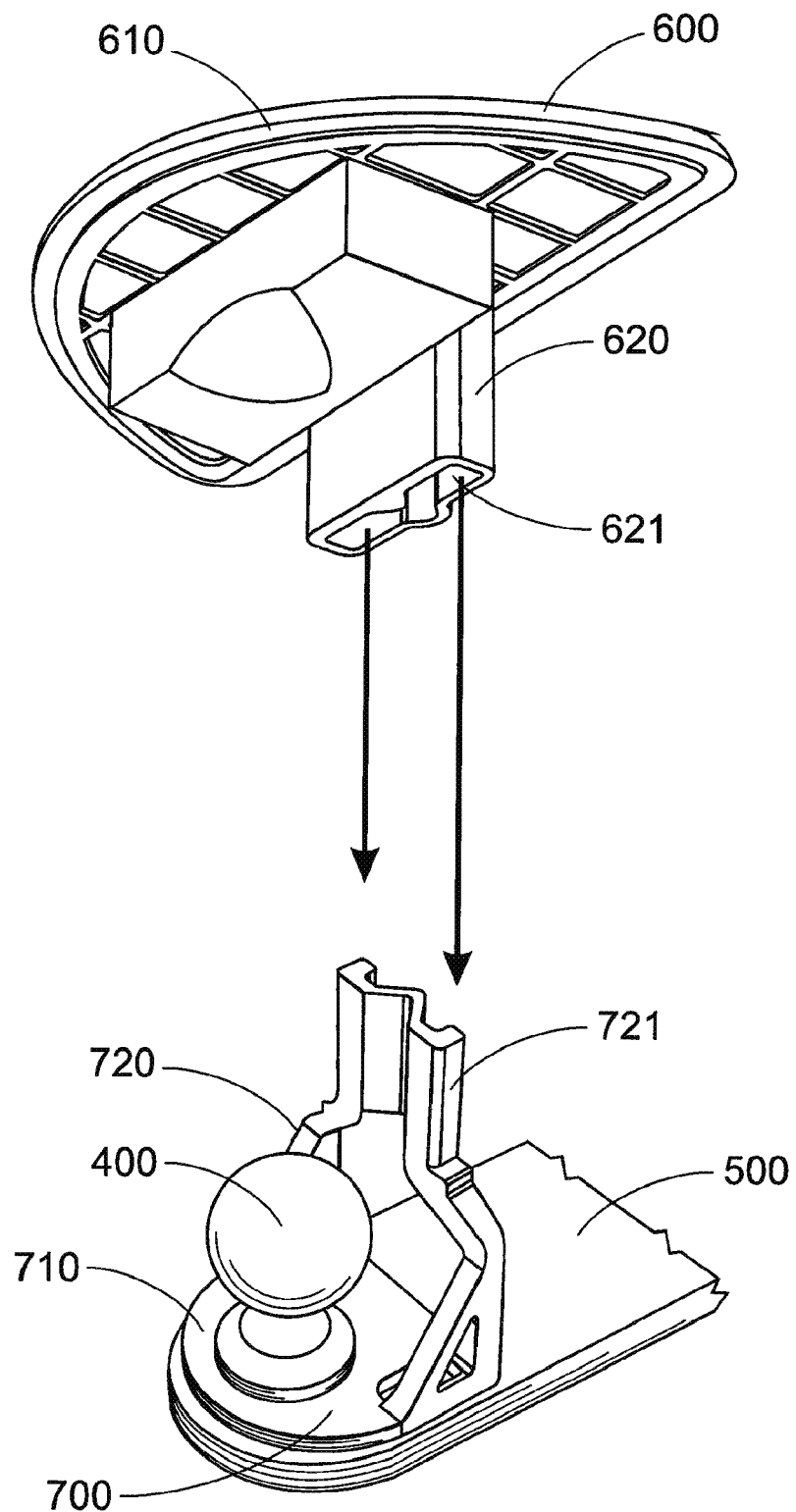
FIG. 3 shows a second embodiment of the invention in an exploded perspective view.

A second embodiment is shown in exploded view in FIG. 3. A step 600 is removably attached to a base 700 such that the step 600, in use, is located above the tow ball 400.

The step 600 includes a platform 610 and a step connecting portion 620. The step connecting portion 620 is a step socket 621 which extends from the platform 610.

The base 700 includes a mounting portion 710 and a base connecting portion 720. The base connecting portion 720 is an extending spigot 721. The extending spigot 721 is shaped to conform to the step socket 621.

Figure 4:
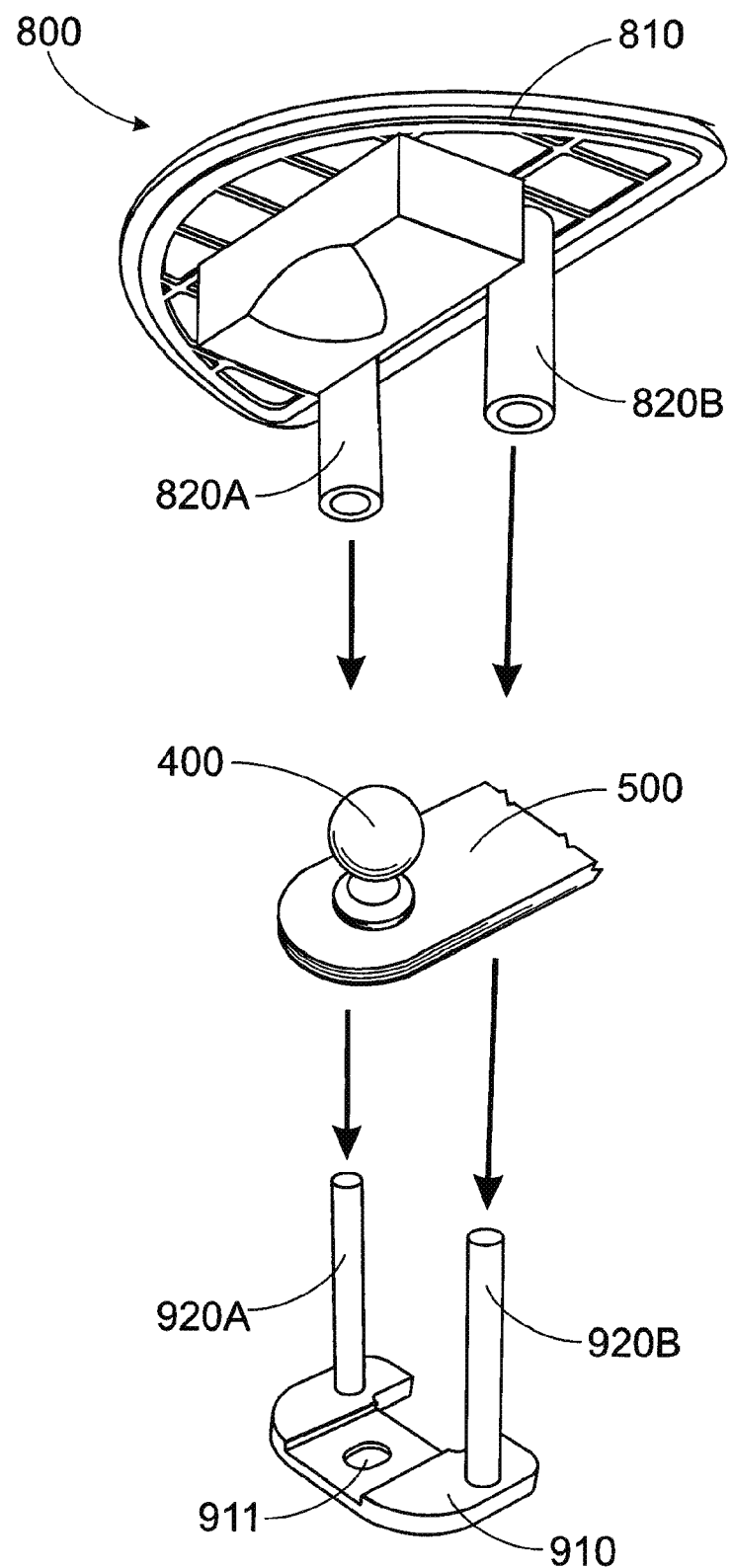
FIG. 4 shows a third embodiment of the invention in an exploded perspective view.

A third embodiment is shown in exploded view in FIG. 4. A step 800 is removably attached to a base 900.

The step 800 includes a platform 810 and two step connecting portions 820A and 820B. The step connecting portions 820A, 820B are extending sockets. Suitably the sockets are cylindrical, however, any shape may be contemplated such as square, rectangular or polygonal. Additionally, the step connecting portions 820A, 820B may be a socket located at an end of a member which is connected by an opposite end of the member to the platform 810. In a further alternative, the step connecting portions 820A, 820B may be apertures in the platform.

The base 900 includes a mounting portion 910 having a base aperture 911 for attaching the mounting portion 910 to the tow hitch 500. The base 900 also includes two base connecting portions 920A and 920B shaped to be received by the step connecting portions 820A and 820B.

Figure 5:
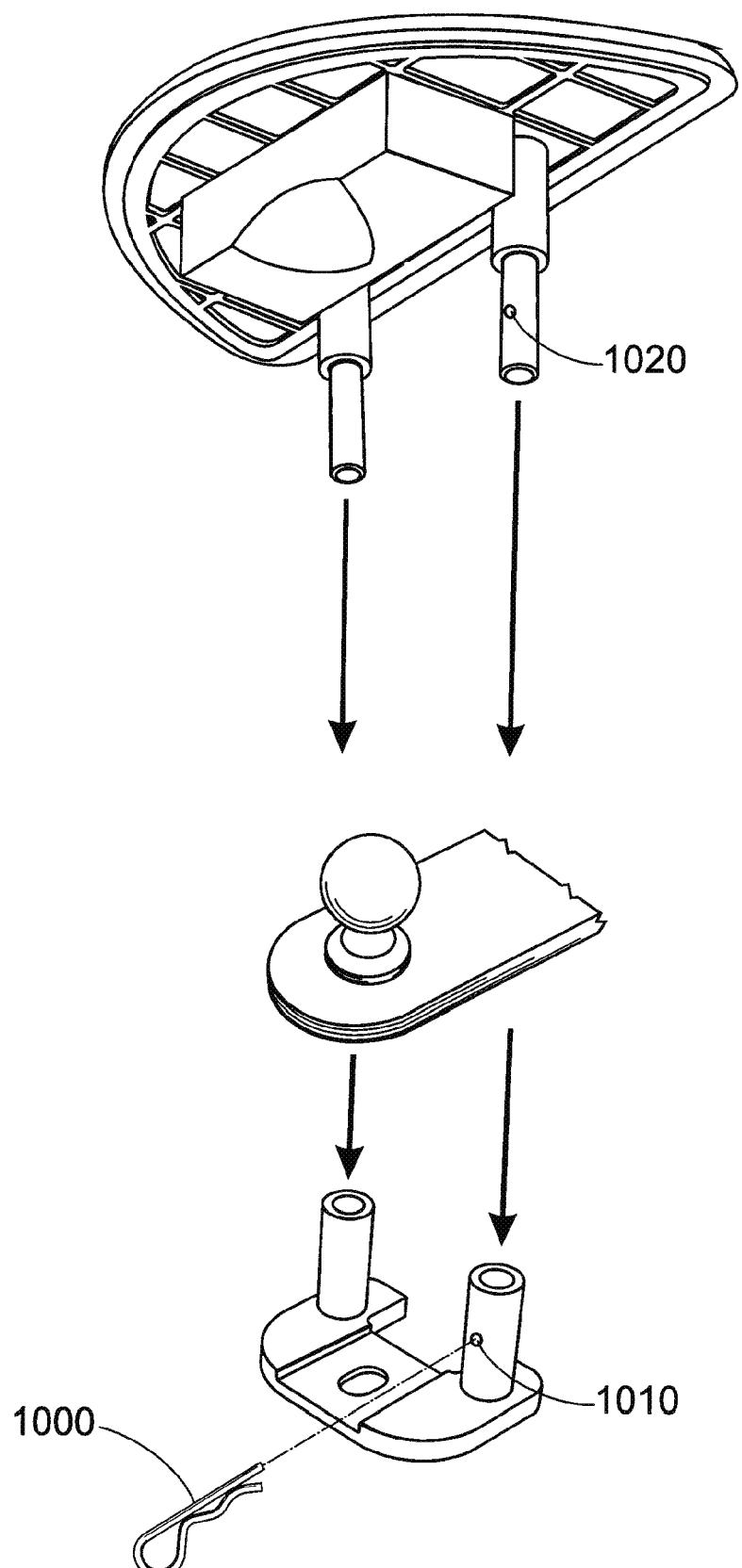
FIG. 5 shows an embodiment of the invention including a locking pin.

As shown in FIG. 5, a locking pin 1000 may pass through both a base locking aperture 1010 in the base connecting portion and a step locking aperture 1020 in the step connecting portion. The locking pin 1000 may be a finger pull pin, as shown, or a padlock. The locking pin 1000 prevents accidental removal of the step from the base or theft of the step.

Figure 6:
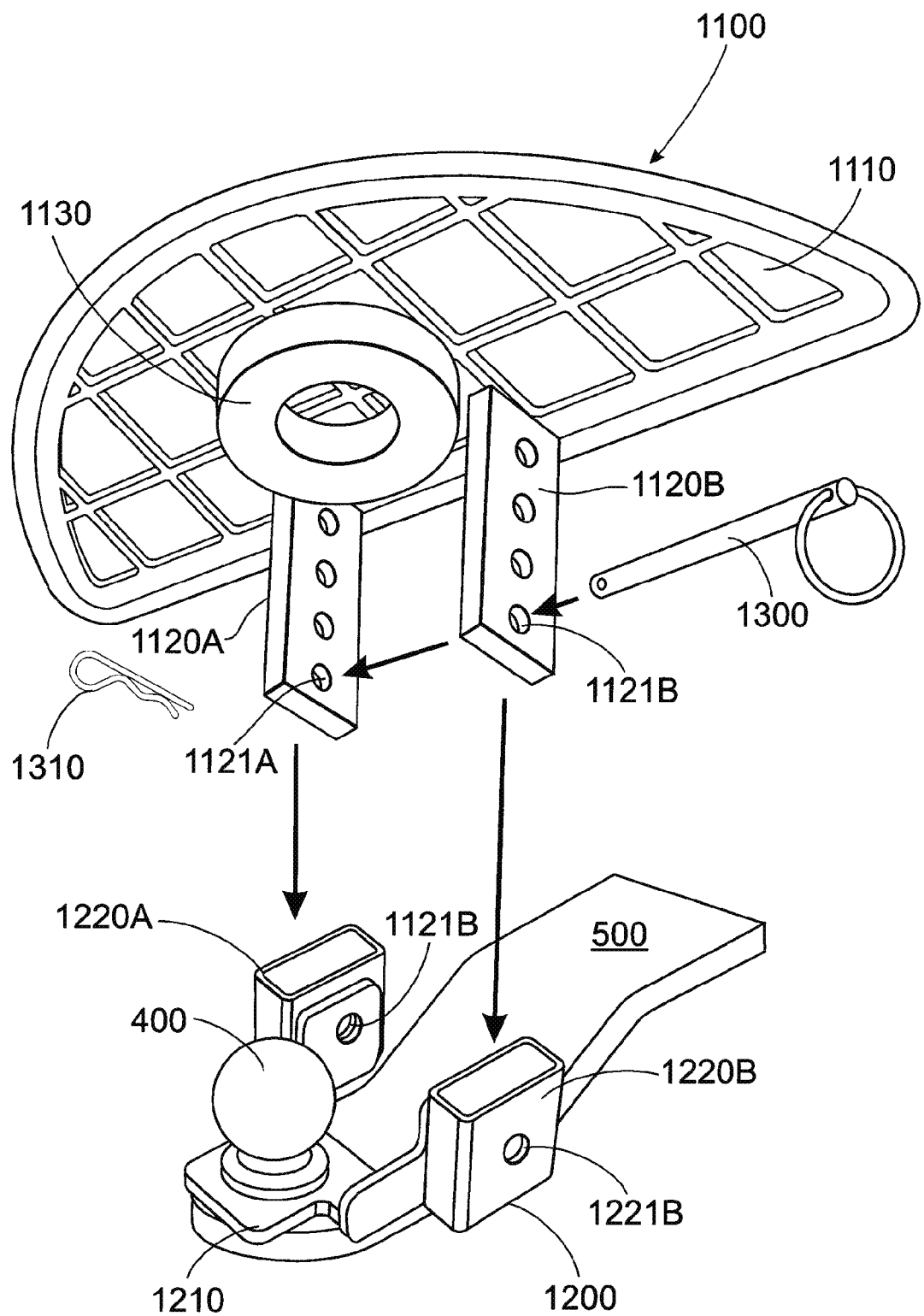
FIG. 6 shows a fourth embodiment of the invention in an exploded perspective view.

FIG. 6 shows a fourth embodiment in an exploded view. A step 1100 is removably attached to a base 1200.

The step 1100 includes a platform 1110 and two step connecting portions 1120A and 1120B. The step connecting portions 1120A, 1120B are extending spigots, having a series of step connecting apertures 1121A and 1121B respectively.

A resilient buffer 1130 is located on the bottom surface 213 of the platform 1110. The resilient buffer 1130 is suitably toroidal in shape to complement the shape of the tow ball 400. The resilient buffer 1130 is preferably formed from rubber or a polymer and prevents contact between the tow ball 400 and the platform 1130 during use of the step 1100.

The base 1200 includes a mounting portion 1210 having a base aperture (not shown) for securing the mounting portion 1210 to the tow hitch 500. The base 1200 also includes two base connecting portions 1220A and 1220B shaped to receive the step connecting portions 1120A and 1120B. Each base connecting portion 1220A and 1220B includes a base connecting aperture 1221A and 1221B respectively.

A pin 1300 is shaped to pass through the base connecting apertures 1221A, 1221B and step connecting apertures 1121A and 1121B, thus locking the step connecting portions 1120A, 1120B to the base connecting portions 1220A, 1220B.

A locking pin 1310 is suitably connected to the pin 1300 to prevent the pin 1300 from accidentally being removed. Locking pin 1310 may alternatively be a padlock to prevent theft of the step 1100.

In use, in relation to FIGS. 1 & 2, the base 300 is located on the tow hitch 500 such that the base aperture 311 is aligned with the tow hitch aperture 510. Tow ball screw 410 extending from the tow ball 400 is then passed through the base aperture 311 and the tow hitch aperture 510. Nut 420 is screwed onto the tow ball screw 410 to secure both the base 300 and the tow ball 400 to the tow hitch 500.

The step connecting portion 220 is then mounted to the base connecting portion 320. This brings the resilient buffer 215 into contact with the tow ball 400. Locking pin 1000, as shown in FIG. 5, or padlock may then be applied to join the step connecting portion 220 and the base connecting portion 320 and prevent removal of the step 200 from the base 300.

The simple removable mounting between the step and the base allows quick installation of the step, without necessitating removal of the tow ball once the base has been installed. The base can remain in place as a semi-permanent fixture and the step mounted and removed as desired. The resilient buffer on the bottom surface of the platform reduces damage to both the tow ball and the platform. Additionally, if the step remains in place whilst the towing vehicle is in motion, the resilient buffer reduces noise resulting from vibration of the device.

Throughout the specification the aim has been to describe the invention without limiting the invention to any one embodiment or specific collection of features. Persons skilled in the relevant art may realize variations from the specific embodiments that will nonetheless fall within the scope of the invention. For example, the distance between the step and the base may be varied to allow mounting of the step to the base whilst a coupler is connected to the tow ball.

Additionally, the base may be secured to the underside of the tow hitch so that the tow hitch is intermediate the tow ball and the base.

It will be appreciated that various other changes and modifications may be made to the embodiment described without departing from the spirit and scope of the invention.

What is claimed is:

1. A device for attachment to a tow hitch, comprising:
    a step including a platform and at least one step connecting portion;
    a base including at least one base connecting portion and a mounting portion;
    a base aperture located in the mounting portion to allow passage of a tow ball screw depending from a tow ball;
    wherein the step connecting portion is a tongue extending from the platform, the base connecting portion comprises struts extending from the mounting portion and at least one crosspiece extending between the struts, the struts and the at least one crosspiece defining a slot having a long narrow opening for receiving the tongue, and the step connecting portion is removably attachable to the base connecting portion.

2. The device according to claim 1, wherein two or more crosspieces extend between the struts to form the slot for receiving the tongue.

3. The device according to claim 2, further comprising one or more stabilizing tongues extending from the platform.

4. The device according to claim 1, wherein the step further comprises a resilient buffer located to prevent the platform from contacting a tow ball mounted on the tow hitch.

5. The device according to claim 1, further comprising a base locking aperture located through the base connecting portion, a step locking aperture located through the step connecting portion, and a locking pin which is removably mounted through both the base locking aperture and the step locking aperture.

6. The device according to claim 1, wherein the mounting portion may be removably secured between the tow hitch and a tow ball.

7. The device according to claim 1, wherein the mounting portion may be removably secured such that the tow hitch is located between the mounting portion and a tow ball.

8. The device according to claim 1, wherein the platform has a generally semi-circular shape.

9. The device according to claim 1, wherein the platform has a multiplicity of projections and/or depressions in order to provide a nonslip surface.

10. A method of providing a step over a tow hitch including the steps of:
   attaching a base to the tow hitch by using a tow ball screw depending from a tow ball; and
   mounting the step onto the base;
   wherein the base comprises at least one base connecting portion comprising struts extending from the mounting portion and at least one crosspiece extending between the struts to define a slot having a long narrow opening, and a mounting portion, the step comprises a platform and at least one step connecting portion, being a tongue extending from the platform for insertion into the slot, and the step connecting portion is removably attachable to the base connecting portion.

11. The method according to claim 10, further including the step of inserting a locking pin into both a base locking aperture in the base connecting portion and a step locking aperture in the step connecting portion.

12. The method according to claim 10, wherein the step further comprises a resilient buffer located to prevent the platform from contacting a tow ball attached to the base and the tow hitch.

13. The device according to claim 1, wherein distal end portions of the struts are bent towards one another, and wherein the slot is at least partially defined by the at least one crosspiece and the distal end portions of the struts.

14. The device according to claim 1, further comprising a step locking aperture located through the step connecting portion, and a locking pin which is removably mounted through the step locking aperture to lock the step to the base.

* * * * *